March 27, 1945.　　　　G. WEBB　　　　2,372,462
CARTRIDGE FEEDING MECHANISM FOR AUTOMATIC FIREARMS
Filed Feb. 7, 194_　　2 Sheets-Sheet 1
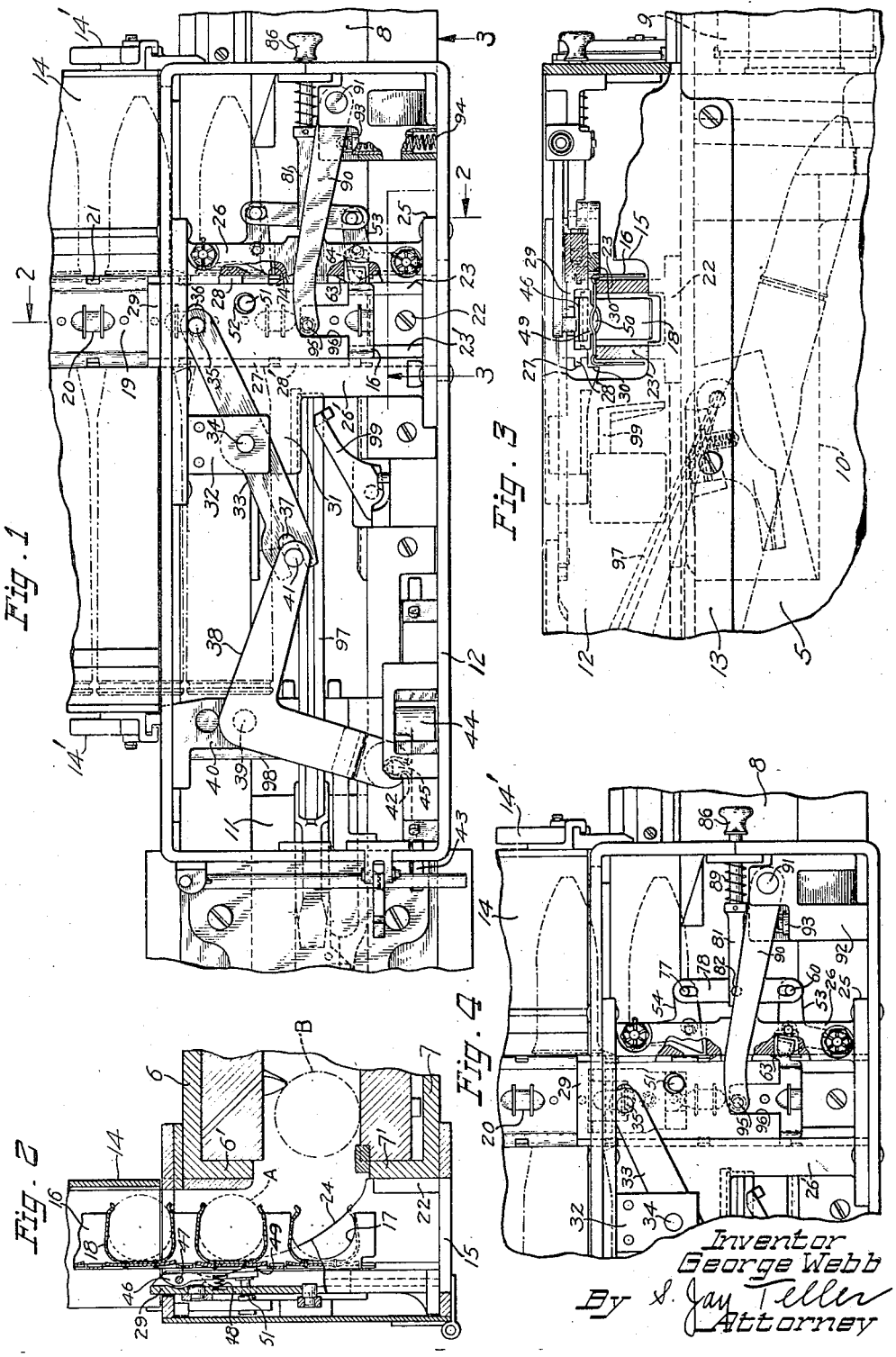
Inventor
George Webb
By S. Jay Teller
Attorney March 27, 1945. G. WEBB 2,372,462
CARTRIDGE FEEDING MECHANISM FOR AUTOMATIC FIREARMS
Filed Feb. 7, 1941 2 Sheets-Sheet 2
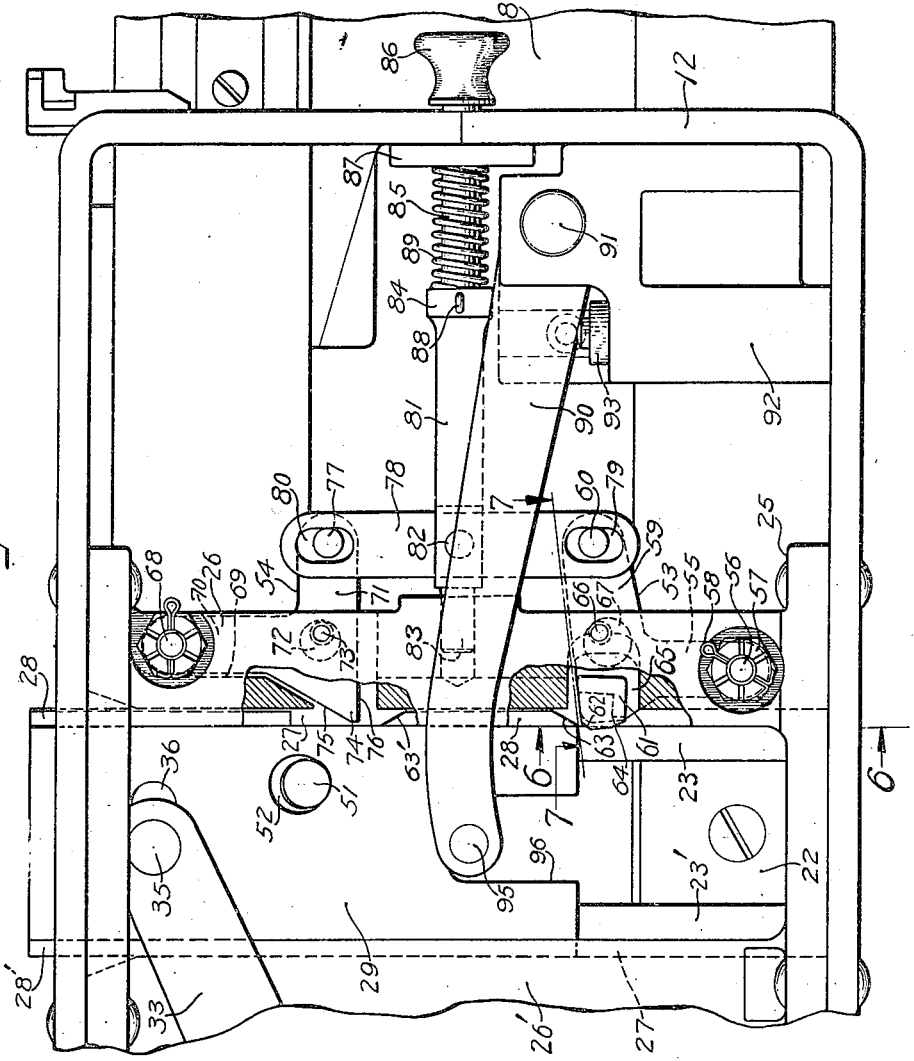
Inventor
George Webb
By S. Jay Teller
Attorney Patented Mar. 27, 1945

2,372,462

UNITED STATES PATENT OFFICE 2,372,462

CARTRIDGE FEEDING MECHANISM FOR AUTOMATIC FIREARMS

George Webb, Hartford, Conn., assignor to Colt's Patent Fire Arms Manufacturing Company, Hartford, Conn., a corporation of Connecticut Application February 7, 1941, Serial No. 377,818

3 Claims. (Cl. 89—33)

The present invention relates to cartridge feeding mechanism for automatic firearms, and particularly to mechanism for establishing and accurately maintaining the cartridge feeder assemblies in proper timed relation with the functioning of the gun to avoid misfiring and jamming.

As is well-known, automatic firearms are subjected to various forces and operated from various positions and angles especially when flexibly mounted on aircraft; and in the case of 37 mm. guns the feeder assemblies, that is feeder strips loaded with cartridges to be fed into the guns, are of considerable weight. As a consequence appreciable force is required to initially insert the feeder assemblies into the guns, and it is highly important to exactly locate the feeder assemblies in the feed channels and to prevent over-movement as well as retrograde movement thereof during functioning of the gun as well as during battle maneuvers which impose upon the feeder assemblies tendencies to shift their established positions.

In my co-pending application, Serial No. 325,405. I have provided an arrangement of stop and retaining pawls adapted to accomplish the aforesaid desired objects. The present invention provides several improvements over the invention disclosed in my said co-pending application.

One of the important features of the present invention is the construction and arrangement of the stop and retainer pawls whereby they are individually operable with respect to the feeder to prevent over-movement in the feeding direction as well as retrograde movement after the feeder has been established in operative position in the gun; and also whereby the pawls are collectively disengageable from the feeder to permit withdrawal thereof from the gun.

Another important feature of the present invention resides in the provision of a stop pawl having a tooth or the like normally disposed in the feed channel for direct engagement or abutment by the shoulder of a notch in the forward end of the feeder when the feeder has been inserted to its full or proper initial extent to effect subsequent intermittent feed of the successive cartridges; and the said pawl having a cam surface for engagement by the feed slide during its reciprocating movements in timed relationship to the functioning of the gun to move said tooth into and out of spaced notches in the feeder to prevent over-movement of the feeder and avoid misfiring.

Another feature of the invention resides in the provision of means which in co-operation with the mechanism by which the feed slide is reciprocated assures full return of the feed slide and its feed pawl to feeder engaging position from which it moves the feeder step-by-step across the feed channel.

Still other features of the invention reside in the provision of unitary supports for parts of the feeding mechanism whereby assembly and replacement of parts is greatly facilitated.

The foregoing and other objects and advantages of the invention will become more apparent and will be pointed out in detail during the course of the following description of the accompanying drawings.

In the accompanying drawings I have shown the now preferred embodiment of the invention, but it will be understood that the drawings are intended for illustrative purposes only and are not to be construed as defining or limiting the scope of the invention, the claims forming a part of this specification being relied upon for that purpose.

In the drawings:

Fig. 1 is a fragmentary plan view of an automatic firearm with the feed box cover omitted showing the feeding and firing mechanism in the positions which they normally assume after the first cartridge has been stripped from the feeder for insertion into the barrel chamber for firing;

Fig. 2 is a fragmentary vertical sectional view taken along the line 2—2 of Fig. 1;

Fig. 3 is a fragmentary horizontal sectional view along the line 3—3 of Fig. 1;

Fig. 4 is a fragmentary plan view similar to Fig. 1 but showing the feeder retaining pawl released to permit withdrawal of the feeder;

Fig. 5 is a fragmentary plan view of the forward end of the feed box similar to Fig. 1, but on an enlarged scale and with the cartridge feeder and supporting tray removed;

Fig. 6 is a sectional view taken along the line 6—6 of Fig. 5; and

Fig. 7 is a sectional view taken along the line 7—7 of Fig. 5, the parts being shown inverted by mechanical projection.

The breech casing of the gun is designated by the numeral 5 and includes side plates 6 and 7 connected at the front by the usual trunnion block 8. The barrel 9 of the gun, as shown more clearly in Patent 1,525,065 granted to J. M. Browning, and my co-pending application, Serial No. 325,405, filed March 22 1940, is connected to a barrel extension 10 mounted in the breech casing 5 for longitudinal reciprocating movements on recoil and counter-recoil. These reciprocating movements of the barrel extension 10 and the lock frame 11 actuate the cartridge feeding, charging, firing, extracting, and ejecting means, but since the present invention relates to the cartridge feeding means, only general reference sufficient to disclose the operation will be made herein to the other means.

A feed box 12 is mounted on the top of the breech casing 5 with its side plates overlapping the tops of the side plates 6 and 7 and suitably secured thereto as indicated at 13. The feed box houses members of the cartridge feeding mechanism described in detail in my said co-pending application, Serial No. 325,405. A shelf-like loading tray 14 is shown attached to the feed box by latches 14', but a magazine may be substituted for the loading tray. When the tray is used it is adapted to receive and support the feeder assemblies, that is the cartridge feeders and cartridges therein, in alignment with openings in the side walls of the feed box. The opening in the left side wall is sufficiently large to permit passage of the feeder and cartridges therethrough, while the opening 15 in the right side wall is just sufficiently large to accommodate the feeder after the cartridges have been stripped therefrom.

The feeder may be either of the rigid or flexible articulated link types shown and described in detail in my said co-pending application, but in connection with the present invention I have illustrated the rigid type of feeder comprising a sheet metal strip 16 bent longitudinally to the shape of an inverted U. The depending side flanges of the body are provided with notches 17 to accommodate the cartridges which are held in place by means of spring clips 18, suitably secured to the top 19 of the feeder at regular predetermined spaced intervals and in alignment with notches 17. The top 19 of member 16 is transversely slotted to provide for forming upstanding oppositely facing shouldered feed lugs 20. No further detailed description of the cartridge feeder need be given at this time except to point out that the top 19 is provided with notches 21 along its longitudinal edges and at its corners. The spacing between the notches 21 is the same as the spacing between the cartridges when loaded in the feeder, and the spacing of feeder lugs 20.

To support and guide the feeder assembly, that is, the member 16 with the cartridges mounted therein, through the feed channel transversely of the casing 5, I provide a preferably unitary structure comprising a base 22 which is suitably secured on top of the inturned flanges 6' and 7' of the side plates 6 and 7 of the casing, and upstanding spaced plates 23, 23'. It will be noted by reference to Fig. 3, that the depending sides of the member 16 are slightly spaced from the plates 23, 23' while the top of the member 16 rests on and is supported by the top edges of the plates 23, 23' and that the clips 18 move between the said plates. By referring to Fig. 2 it will be noted that the plates 23, 23' are formed with curved cam faces 24 so constructed and arranged as to be engaged by the cartridges successively during their movement with the feeder through the feed channel to be stripped from the clips 18 and positioned for engagement by means for inserting the cartridges into the breech end of the barrel as will be explained later.

A bracket 25 is secured between the side walls of the feed box adjacent the top edges thereof, and is in the nature of a sturdy metal plate having spaced cross pieces 26, 26' arranged above plates 23, 23'. The inner faces of the cross pieces are provided with channels 27 (Fig. 3) which receive longitudinal tongues 28, 28' of the feed slide 29, presently described more in detail. The upper portions of the flanges of the feeder confront the lower portions 30 of the inner faces of the cross pieces 26 to further afford guided movement to the feeder as it is moved into and through the feed channel.

The cross piece 26' of bracket 25 (Fig. 1) has an extension 31 at one end, and a plate 32 is mounted above a portion of said extension in fixed spaced relation thereto. A lever 33 extends through the space between plate 32 and extension 31, and is pivoted on pin or stud 34 engaged between said extension and plate. One end of lever 33 has a depending stud 35 engaged in a transverse slot 36 adjacent one end of feed slide 29, and the other end of lever 33 is notched as at 37. A bell crank lever 38 is pivotally mounted for oscillation about a vertical axis on stud 39 engaging in bracket 40. A stud 41 on one arm of bell crank lever 38 is disposed in notch 37 of lever 33, while the end of the other arm of bell crank lever 38 is notched as at 42. A feed lever 43 is mounted for pivotal movement on the right side wall of the feed box about a horizontal axis as indicated at 44, and carries a swivel stud 45 intermediate its ends, said swivel stud being located in notch 42 of bell crank 38. The means whereby the feed lever is actuated to cause oscillation of bell crank 38 through engagement of the swivel stud 45 and notch 42 is not shown in the present application, but is shown in said co-pending application, Serial No. 325,405, wherein the barrel extension is provided with a stud which engages the feed lever on recoil and counter-recoil movements of the barrel extension to cause rocking movement of the feed lever. It should be apparent that such movements of the feed lever will rock bell crank 38, which in turn will swing lever 33 on its pivot 34, and thus effect reciprocating movement of feed slide 29.

As previously mentioned the feed slide comprises a metal plate 29 having longitudinal tongues 28, 28' disposed in channels 27 in the cross pieces 26, 26' of bracket 25, whereby it has guided reciprocating movement when actuated by lever 33 to move the cartridge feeder assembly through the feed channel of the gun. Of course, this movement of the cartridge feeder assembly is made step-by-step and in synchronism with the recoil and counter-recoil movements of the barrel extension of the gun since the feed slide is operated by lever 33 indirectly actuated by lever 43 directly operated by the barrel extension. It has also been previously pointed out that the spacing between the notches 21 in the feeder is the same as the spacing between the cartridges when loaded in the feeder, and the spacing of the feeder lugs 20. A feed pawl 46 (Fig. 2) is pivotally mounted at 47 on the slide 29 and disposed on its under side. A coil spring 48 is mounted between the feed pawl 46 and slide plate 29 and urges the inner end 49 of the feed pawl downwardly, the extent of said downward movement when the feeder is not in the feed channel being limited by contact of the outer end of the feed pawl against the slide plate 29. The end 49 of the feed pawl is formed centrally with a lip 50 to engage the lugs 20 on the top of the feeder and push the feeder through the feed channel step-by-step to accurately position the cartridges for firing successively after the first cartridge has been fired and imparts recoil movement to the barrel extension. A handle 51 is attached to the feeder pawl and extends through an opening 52 in the feed slide plate 29 so that it may be grasped and raised to elevate the lip 50 above lugs 20 when it is desired to withdraw the cartridge feeder assembly. This will be explained later since the invention also provides other means holding the cartridge assembly against retrograde movement until manually released.

The means provided by the present invention for controlling or regulating the feeding of the cartridges to the gun with extreme accuracy and surety against accidental displacement of the cartridge feeder and cartridges carried thereby to avoid misfiring and jamming is shown most clearly in Fig. 5, wherein the numeral 53 designates generally a cartridge feeder stop and 54 a cartridge feeder retainer, both being shown in the positions they occupy when there is no feeder in the gun.

The stop 53 preferably comprises a substantially rectangular lever having one of its arms 55 pivoted adjacent its end on a bolt 56 secured through said arm and bracket 25 by a castellated nut 57 and cotter pin 58. The arm 55 of the stop extends transversely of the feed box and is disposed adjacent the feed channel on one side thereof between plate 23 of the feeder support and cross piece 26 of bracket 25. The other arm 59 of the stop extends forwardly in the feed box and is provided with a stud 60 adjacent its end. As shown best in Figs. 6 and 7, the stop 53 has formed on its corner an upstanding lug 61 which in turn has formed on its upper end a cam surface or lip 62 located in alignment with the channel 27 of the cross piece 26 in which the tongue 28 of the feed slide moves. The lip 62 normally projects into the feed channel for engagement by the front bevelled end 63 of said rib 28 of the feed slide whereby the stop pawl will be cammed back in clockwise direction, as presently described in detail, when the slide moves in feeding direction. The rib 28 is interrupted to provide for a rear camming surface 63' to move the pawl or stop 53 on retrograde movement of the slide. The bottom corner of the stop pawl is cut out to provide a tooth 64 engageable in the notches 21 of the feeder as the feeder is intermittently moved through the feed channel, as explained more in detail later. The cross piece 26 is provided with a recess 65 of sufficient size to permit the lug 61 to move freely therein as the stop pawl 53 oscillates on its pivot 56 under the camming action of rib 28 of the feed slide during its reciprocating movement. A stud 66 on the under side of bracket 25 is disposed in an opening 67 in the pawl or stop 53, and the relative size and arrangement of the stud and opening is such as to limit the movement of the stop or pawl, particularly toward the feed channel, so that the lip or cam surface 62 will normally be located in the position shown in Fig. 5 for proper engagement by the bevelled surface 63 on rib 28 of the feed slide.

The retainer 54 is also a substantially rectangular lever pivotally mounted similar to the stop 53 on a bolt 68 at the opposite end of bracket 25 and movable on its pivot in a recess 69 in the under side of cross piece 26. The transversely extending arm 70 of the retainer 54 is located adjacent the feed channel, and the forwardly extending arm 71 is provided with an opening 72 receiving stud 73 on the under side of cross piece 26, said opening and stud being similar to opening 67 and stud 66 and are provided for the same purpose. Recess 69 opens into the feed channel so that the prong or elongated tooth 74 may normally project across channel 27 and be disposed in the path of notches 21 of the feeder. The edge 75 of the tooth 74 is inclined across the path of movement of the feeder so that the tooth or prong 74 will be cammed and swung in counter-clockwise direction when the forward edge of the feeder engages and moves along the surface 75, as should be obvious. The edge 76 of the tooth or prong 74 is normally substantially perpendicular to the side of the feeder 16 for holding engagement with notches 21 in the event of tendency of the feeder to have retrograde movement. The arm 71 of the retainer or pawl 54 has a stud 77 adjacent its end and in substantially transverse alignment with stud 60 on stop or pawl 53.

The pawls 53 and 54 are individually movable on their pivots relative to the feeder, and I provide a common means normally biasing them toward the feeder, and also affording movement of the said pawls collectively away from the feeder when the feeder is to be removed from the feed channel by retrograde movement, which is sometimes desirable when all of the cartridges in the feeder assembly have not been fired. To the accomplishment of these objects, I provide a connector 78 in the nature of a plate extending between and across the arms 59 and 71 of the pawls 53 and 54, respectively. The connector 78 is provided adjacent its ends with slots 79 and 80, which receive the studs 60 and 77, respectively. The slots are of sufficient length to permit the studs 60 and 77 to move therein to the full extent of movement afforded by the studs 66 and 73 in the openings 67 and 72, respectively. The plate 78 is connected at its center to a shaft 81 by suitable means as indicated at 82. The shaft 81 has a reduced end 83 which is reciprocable in an opening provided therefor in the cross piece 26 of the bracket 25. The other end of the shaft is provided with a collar 84, and said other end is drilled to receive the stem 85 of the manually operable pawl release handle 86 located for convenience on the exterior of the feed box at the front thereof. The stem 85 has guided movement through the front wall of the feed box and a block or plate 87 suitably secured to the inner side of the front wall, and the inner end of the stem 85 is secured in the socket provided therefor in the end of the shaft 81 by a cotter pin 88. A coil spring 89 is mounted around stem 85 and compressed between plate 87 and collar 84 to force the shaft and consequently connector 78 rearwardly so that the pawls 53 and 54 are normally biased toward the feed channel through their stud and slot connection with the connector 78, or to the position of Fig. 5.

The feed slide is reciprocated in the feed channel in timed relation with the functioning of the gun by the lever 33 and other mechanism as previously described. To assure that the feed slide is returned completely to its retracted position so that the feed pawl 46 will engage the lugs 20 on the feeder, I provide a lever 90, fulcrumed at one end on pivot 91 in bracket 92 suitably secured in one corner of the feed box. A spring pressed plunger 93 in bracket 92 bears against one edge of the lever 90 normally urging the lever to swing in clockwise direction on its pivot 91. The lever 90 is relatively long and the spring 94 which presses against the plunger 93 is relatively strong so as to provide ample leverage and force to quickly and surely establish the feed slide in its retracted position of Figs. 1 and 5 wherein its pawl 46 is exactly positioned behind a lug 20 of the feeder. The lever 90 has a stud 95 disposed in slot 96 in the feed slide to exert pressure against the slide and assure its full return to said retracted position.

The mechanism for charging the cartridges into the breech of the barrel is shown only in part, that is, sufficiently to identify it with the said mechanism which is shown far more completely and in detail in my said co-pending application, Serial No. 325,405. In the present application the carrier which moves the cartridges down to the charger (not shown), is designated generally by the numeral 97, and is pivotally mounted in the feed box at 98, in usual manner. The carrier latch which normally holds the carrier in elevated position is designated by the numeral 99, and as usual is mounted in position for engagement by the cartridges as they are stripped from the feeder by the cam surfaces 24 on the plates 23 as shown in Fig. 2. As each successive cartridge trips the carrier latch the carrier moves the successive cartridges into position for engagement by the charger which inserts them into the breech of the barrel.

With the foregoing in mind, the operation should be quite clear, but a description will now be given. As previously stated, the feed mechanism including the feed slide 29, pawls 53 and 54 and associated parts are normally in the position for engagement by the charger which in- in the feed channel.

The corners of the feeder strip are cut away so that the end notches 21 in the feeder 16 are open at their ends whereby upon initial insertion of a feeder assembly, that is, feeder strip with cartridges carried thereby, from the tray 14 into the feed box, the retainer prong or tooth 74 is cammed back by the forward end of the feeder strip when it engages the edge 75. Thereafter the feeder strip and cartridges move onward in feeding direction until the shoulder of the first notch 21 engages against or abuts the tooth 64 on the stop pawl 53. During this movement the first cartridge has been stripped from its clip 18 by the cam surfaces 24 on the plates 23 which support the feeder strip during its movement along the feed channel, and the first cartridge is moved from the position A of Fig. 2 to the position B where it engages the carrier latch 99 tripping the latch and permitting the carrier 97 to swing down on its pivot 98 and position the first cartridge for charging into the breech of the barrel of the gun. By reference to Fig. 1 it will be noted that the tooth 64 of the stop 53 presents a definite limit to initial feeding movement of the feeder through the feed channel. Thereafter the pawl 53 which carries the tooth 64 is cammed back by the bevelled surface 63 on the feed slide which occurs automatically and successively after the first cartridge has been fired by recoil and counter-recoil movements of the barrel extension, which movements actuate the levers 43, 38 and 33. It will be also noted by reference to Fig. 1 that when the first cartridge has been stripped from the feeder and positioned in the gun for charging that the retainer tooth 74 is held adjacent the edge of the succeeding notch 21 so that in the event of any tendency toward retrograde movement of the feeder assembly the tooth 74 will engage in said notch and positively prevent retrograde movement of the feeder assembly to any appreciable extent. In other words the spacing between the tooth 74 and the tooth 64 relative to the spacing between the notches 21 is such that the feeder assembly is positively prevented from shifting movement in the feed channel unless and until the gun functions. It should be obvious that the pressure of the spring 89 which is compressed between the plate 87 and the collar of the shaft 81 normally biases the teeth 64 and 74 to feeder engaging position and maintains the cam surface or lip 62 in the path of movement of the surfaces 63, 63' on feed slide tongue 28 so that the stop 53 will be cammed backward to permit forward intermittent movement of the feeder assembly in accordance with the functioning of the gun to assure against misfiring and consequent jamming.

The pawl 46 on the feed slide engages the lugs 20 on the feeder 16 to move the feeder intermittently as previously explained. It is highly important in connection with obtaining perfect functioning of the feeding mechanism that the pawl 46 be definitely locked behind each of the lugs 20 prior to the feeding movement of the feed slide. In this connection the relatively long lever 90 which is pivotally mounted at 91 in the feed box with the stud 95 on its other end engaging the feed slide is important because the pressure exerted against the lever by the spring pressed plunger 93 is transmitted to the feed slide and in co-operation with the functioning of the levers 33 and 38 assures complete return of the feed slide to establish the pawl 46 in operative relation to the lugs 20 so that the feeder and cartridges carried thereby will be advanced step-by-step in accordance with the functioning of the gun.

It will be noted by comparative reference to Figs. 1 and 5 that the pawls 53 and 54 may have alternating individual swinging movements relative to the feeder since the connector 78 is rockable on pivot 82 by which it is connected to the shaft 81. It will be also noted by reference to Fig. 4 that when it is desired to withdraw a feeder assembly which has been established in operative position in the feed channel by the stop and retainer pawls, it is simply necessary to pull outwardly on handle 86 which disengages the pawls 53 and 54 from the feeder notches against the action of the spring 89 due to the connection of the pawls by the connector 78 and studs 60 and 77. Either after or before or simultaneously with the disengagement of the pawls 53 and 54 from the feeder, the pawl 46 must also be retracted by pulling outward on handle 51 so that the lugs 20 will not engage the feed slide pawl.

In connection with the foregoing, attention is called to the unitary structure of the bracket or frame 25 which supports the lever 33, the said feed slide and the retainer and stop pawls, since this arrangement readily facilitates assembly and replacement of parts.

I claim:

1. In an automatic firearm including a casing having elements reciprocably movable therein in recoil and counter-recoil directions and mechanism operable by said elements during the movement thereof to insert and fire cartridges in the breech of the firearm, the combination of a feed box mounted on the casing and having a feed channel extending therethrough transversely to the longitudinal axis of the firearm, a feeder adapted to hold a plurality of spaced cartridges and having a plurality of longitudinally spaced notches, a feed slide reciprocable transversely to the longitudinal axis of the firearm in timed relationship with the movements of said elements, a pawl mounted on the feed slide and adapted to engage the feeder to move it intermittently through the feed channel, a stop movably mounted adjacent the feed channel and normally engaging one of the notches in the feeder to limit initial movement of the feeder in the feeding direction upon insertion of the feeder through the feed channel, said stop also being adapted to successively engage the other notches in the feeder upon subsequent movement thereof through the feed channel to accurately control delivery of the cartridges to said mechanism for inserting and firing said cartridges in said breech, a retainer movably mounted independently of said stop adjacent the feed channel and positioned to engage the respective feeder notches to prevent substantial retrograde movement of the feeder, means connected to both the stop and retainer and movably mounted and constructed to permit independent engagement of the stop and retainer with the feeder, said connecting means also being otherwise mounted for movement to collectively and substantially simultaneously withdraw said stop and retainer from engagement with the feeder to permit withdrawal of the feeder from said feed channel, and means normally acting against said connecting means to simultaneously bias the stop and retainer into engagement with the feeder.

2. In an automatic firearm including a casing having elements reciprocably movable therein in recoil and counter-recoil directions and mechanism operable by said elements during the movement thereof to insert and fire cartridges in the breech of the firearm, the combination of a feed box mounted on the casing and having a feed channel extending therethrough transversely to the longitudinal axis of the firearm, a feeder adapted to hold a plurality of spaced cartridges and having a plurality of longitudinally spaced notches, a feed slide reciprocable transversely to the longitudinal axis of the firearm in timed relationship with the movements of said elements, a pawl mounted on the feed slide and adapted to engage the feeder to move it intermittently through the feed channel, a stop movably mounted adjacent the feed channel and normally engaging one of the notches in the feeder to limit initial movement of the feeder in the feeding direction upon insertion of the feeder into the feed channel, said stop also being adapted to successively engage the other notches in the feeder upon subsequent movement thereof through the feed channel to accurately control delivery of the cartridges to said mechanism for inserting and firing said cartridges in said breech, a retainer movably mounted independently of said stop adjacent the feed channel and positioned to engage the respective feeder notches to prevent substantial retrograde movement of the feeder, means connected to both the stop and retainer and movably mounted and constructed to permit independent engagement of the stop and retainer with the feeder, said connecting means also being otherwise mounted for movement to collectively and substantially simultaneously withdraw said stop and retainer from engagement with the feeder to permit withdrawal of the feeder from said feed channel, means normally acting against said connecting means to simultaneously bias the stop and retainer into engagement with the feeder, and an operating member engaging said connecting means and accessible on the exterior of the feed box for manually moving said connecting means to effect withdrawal of said stop and retainer from engagement with said feeder when it is desired to withdraw the feeder from the feed channel.

3. In an automatic firearm including a casing having elements reciprocably movable therein in recoil and counter-recoil directions and mechanism operable by said elements during the movement thereof to insert and fire cartridges in the breech of the firearm, the combination of a feed box mounted on the casing and having a feed channel extending therethrough transversely to the longitudinal axis of the firearm, a feeder adapted to hold a plurality of spaced cartridges and having a plurality of longitudinally spaced notches, a feed slide reciprocable transversely to the longitudinal axis of the firearm in timed relationship with the movements of said elements, a pawl mounted on the feed slide and adapted to engage the feeder to move it intermittently through the feed channel, a stop movably mounted adjacent the feed channel normally engaging one of the notches in the feeder to limit initial movement of the feeder in the feeding direction upon insertion of the feeder into the feed channel, said stop also being adapted to successively engage the other notches in the feeder upon subsequent movement thereof through the feed channel to accurately control delivery of the cartridges to said mechanism for inserting and firing said cartridges in said breech, a retainer movably mounted independently of said stop adjacent the feed channel and positioned to engage the respective feeder notches to prevent substantial retrogarde movement of the feeder, means connected to both the stop and retainer and movably mounted and constructed to permit independent engagement of the stop and retainer with the feeder, said connecting means also being otherwise mounted for movement to collectively and substantially simultaneously withdraw said stop and retainer from engagement with the feeder to permit withdrawal of the feeder from said feed channel, and a spring interengaging said connecting means between its connections with said stop and retainer and normally urging said stop and retainer into engagement with said feeder.

4. In an automatic firearm including a casing having elements reciprocably movable therein in recoil and counter-recoil directions and mechanism operable by said elements during the movement thereof to insert and fire cartridges in the breech of the firearm, the combination of a feed box mounted on the casing and having a feed channel extending therethrough transversely to the longitudinal axis of the firearm, a feeder adapted to hold a plurality of spaced cartridges and having a plurality of longitudinally spaced notches, a feed slide reciprocable transversely to the longitudinal axis of the firearm in timed relationship with the movements of said elements, a pawl mounted on the feed slide and adapted to engage the feeder to move it intermittently through the feed channel, a stop movably mounted adjacent the feed channel and normally engaging one of the notches in the feeder to limit initial movement of the feeder in the feeding direction upon inseration of the feeder into the feed channel, said stop also being adapted to successively engage the other notches in the feeder upon subsequent movement thereof through the feed channel to accurately control delivery of the cartridges to said mechanism for inserting and firing said cartridges in said breech, a retainer movably mounted independently of said stop adjacent the feed channel and positioned to engage the respective feeder notches to prevent substantial retrograde movement of the feeder, means connected to both the stop and retainer and movably mounted and constructed to permit independent engagement of the stop and retainer with the feeder, said connecting means also being otherwise mounted for movement to collectively and substantially simultaneously withdraw said stop and retainer from engagement with the feeder to permit withdrawal of the feeder from said feed channel, an operating member engaging said connecting means between its connections with said stop and retainer and accessible on the exterior of the feed box for manually moving said connecting means to effect withdrawal of said stop and retainer from engagement with said feeder when it is desired to withdraw the feeder from the feed channel, and a spring carried by said operating member and acting thereagainst to normally urge the stop and retainer into engagement with said feeder.

5. Control means for the feeding mechanism of an automatic firearm, including movable operating parts and a feed box provided with a feed channel extending transversely to the longitudinal axis of the firearm and through which a cartridge feeder is adapted to be advanced and also including a feed slide mounted in the feed box for reciprocable movement in a path substantially parallel to the axis of the feed channel to intermittently advance a feeder in timed relation with the functioning of the movable operating parts of the firearm, said control means comprising in combination, a pair of pawls adapted to be independently pivotally mounted adjacent the feed channel and adapted to engage a feeder when the feeder is being fed through the feed channel by the feed slide, one of said pawls being adapted to act at pre-determined intervals to engage and stop the movement of the feeder in feeding direction and the other pawl being adapted to engage the feeder to serve as a retainer to prevent appreciable retrograde movement thereof, means secured to said pawls to connect the same and mounted for movement to collectively and substantially simultaneously move said pawls in feeder disengaging direction to permit withdrawal of the feeder from said feed channel, and biasing means normally acting against said connecting means and adapted to simultaneously urge said pawls in feeder engaging direction.

6. Control means for the feeding mechanism of an automatic firearm, including movable operating parts and a feed box provided with a feed channel extending transversely to the longitudinal axis of the firearm and through which a cartridge feeder is adapted to be advanced and also including a feed slide mounted in the feed box for reciprocable movement in a path substantially parallel to the axis of the feed channel to intermittently advance a feeder in timed relation with the functioning of the movable operating parts of the firearm, said control means comprising in combination, a pair of pawls adapted to be independently pivotally mounted adjacent the feed channel and each having an arm arranged in spaced relation to each other, one of said pawls being adapted to act at pre-determined intervals to engage and stop the movement of the feeder in feeding direction and the other pawl being adapted to engage the feeder to serve as a retainer against retrograde movement of the feeder, means connected to the arms of said pawls and mounted to permit independent engagement of the pawls with the feeder, said connecting means being movable mounted and arranged to collectively and substantially simultaneously withdraw said pawls from engagement with the feeder to permit withdrawal of the feeder from said feed channel, an operating member secured to said connecting means and adapted to extend through the feed box whereby it may be manually operated from the exterior of the feed box, said operating member being movably mounted and arranged to move said connecting means and pawls in feeder disengaging direction to permit withdrawal of the feeder from the feed channel, and a spring supported by said operating member and normally biasing the same to urge said pawls into a position wherein they are engageable with said feeder.

7. Control means for the feeding mechanism of an automatic firearm, including movable operating parts and a feed box provided with a feed channel extending transversely to the longitudinal axis of the firearm and through which a cartridge feeder is adapted to be advanced, and also including a feed slide mounted in the feed box for reciprocable movement in a path substantially parallel to the axis of the feed channel to intermittently advance a feeder in timed relation with the functioning of the movable operating parts of the firearm, said control means comprising in combination, a pair of substantially bell crank-shaped-levers each adapted to be independently pivotally mounted at one end adjacent the feed channel with one arm of each normally disposed substantially parallelly to the feed channel and the other arm projecting transversely to the longitudinal axis of the feed channel, said levers also each having a pawl normally adapted to project into the feed channel and said pawls also being respectively adapted at pre-determined intervals to engage the feeder to stop movement thereof in feeding and retrograde directions, a bar connected to the transversely projecting arms of the levers and movably mounted to permit independent movement of the pawls with respect to the feeder, said bar being adapted to be moved to collectively and substantially simultaneously move said pawls in feeder disengaging direction to permit withdrawal of the feeder from said feed channel, and a shaft mounted for substantially reciprocable movement transversely to said bar and connected thereto between the connections of said bar to said levers, said shaft being constructed so as to be accessible on the exterior of the feed box and arranged to be actuated to move said bar and also said levers and pawls in the manner described.

8. Control means for the feeding mechanism of an automatic firearm, including movable operating parts and a feed box provided with a feed channel extending transversely to the longitudinal axis of the firearm and through which a cartridge feeder is adapted to be advanced and also including a feed slide mounted in the feed box for reciprocable movement in a path substantially parallel to the axis of the feed channel to intermittently advance a feeder in timed relation with the functioning of the movable operating parts of the firearm, said control means comprising in combination, a pair of substantially bell crank-shaped-levers each adapted to be independently pivotally mounted at one end adjacent the feed channel with one arm of each normally disposed substantially parallelly to the feed channel and the other arm projecting transversely to the longitudinal axis of the feed channel, each of said levers,also having a pawl adapted to normally project into the feed channel and said pawls also being respectively adapted at pre-determined intervals to engage the feeder to stop movement thereof in feeding and retrograde directions, a bar connected to the transversely projecting arms of the levers and movably mounted to permit independent movement of the pawls with respect to the feeder, said bar being adapted to be moved to collectively and substantially simultaneously move said pawls in feeder disengaging direction to permit withdrawal of the feeder from said feed channel, a shaft mounted for substantially reciprocable movement transversely to said bar and connected thereto between the connections of said bar to said levers, said shaft being constructed so as to be accessible on the exterior of the feed box and arranged to be actuated to move said bar and also said levers and pawls in the manner described, and a spring on said shaft normally biasing said shaft to simultaneously urge said pawls in feeder engaging direction.

GEORGE WEBB.

CERTIFICATE OF CORRECTION.

Patent No. 2,372,462. March 27, 1945.

GEORGE WEBB.

It is hereby certified that error appears in the printed specification of the above numbered patent requiring correction as follows: Page 1, first column, line 13, for "s'rips" read --strips--; page 4, first column, line 42, for "tion for engagement by the charger which in-" read --tion of Fig. 5, when there is no feeder strip 16--; page 5, second column, line 33, claim 3, after "channel" insert --and--; line 46, same claim, for "retrogarde" read --retrograde--; page 6, first column, line 4, for "inseration" read --insertion--; and that the said Letters Patent should be read with this correction therein that the same may conform to the record of the case in the Patent Office.

Signed and sealed this 7th day of August, A. D. 1945.

(Seal)            Acting Leslie Frazer Commissioner of Patents.